T. H. Muller.
Sectional Steam Boiler.
No. 3,853. Reissued Mar. 1, 1870.
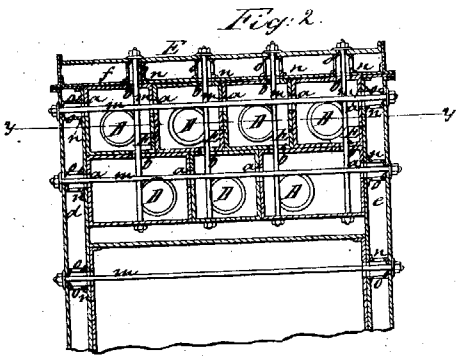
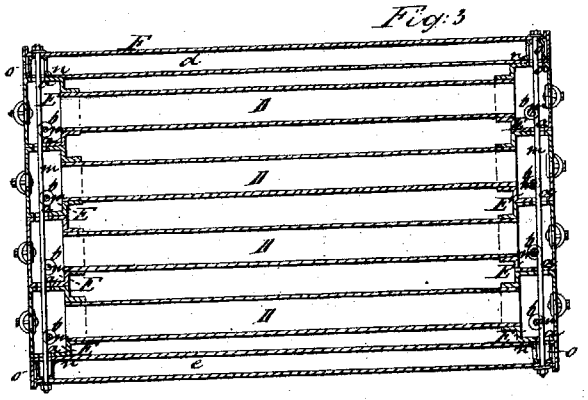
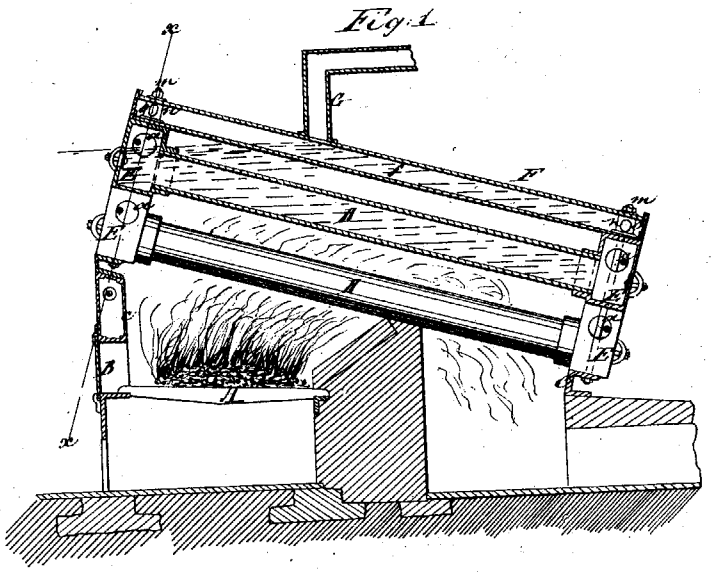
Witnesses.
Hermann Gros
Chas Wahlers
Inventor
T H Muller
By Van Santvoord & Hauff
his attys.
N. PETERS, PHOTO-LITHOGRAPHER, WASHINGTON, D. C.

United States Patent Office.

W. P. ABENDROTH, JOHN GRIFFITH, G. W. WUNDRAM, AND T. H. MÜLLER, OF NEW YORK, N. Y., ASSIGNEES OF T. H. MÜLLER.

*Letters Patent No.* 83,528, *dated October* 27, 1868; *reissue No.* 3,853, *dated March* 1, 1870.

IMPROVEMENT IN STEAM-GENERATORS.

The Schedule referred to in these Letters Patent and making part of the same.

*To all whom it may concern:*

Be it known that T. H. MÜLLER, of the city, county, and State of New York, has invented a new and useful Improvement in Steam-Boilers; and we hereby declare the following to be a full, clear, and exact description thereof, which will enable those skilled in the art to make and use the same, reference being had to the accompanying drawing forming part of this specification, in which drawing—

Figure 1 represents a longitudinal vertical section of this invention.

Figure 2 is a transverse section thereof, taken in the plane indicated by the line *x x*, fig. 1.

Figure 3 is a horizontal section of the same, the line *y y* in fig. 2 indicating the plane of section.

Similar letters indicat. corresponding parts.

This invention relates to certain improvements in that class of steam-boilers which are technically known as "sectional boilers," and which are composed of a series of independent pipes by preference placed in an inclined position over the fire-place, and made to communicate with each other and with a common steam-dome in such a manner that each pipe forms an independent water-space, which is exposed to the direct action of the fire, and from which the steam rises into the common steam-dome.

These improvements consist in the arrangement of heads provided with openings in their sides, in combination with the horizontal or inclined water-pipes, in such a manner that a side circulation is produced throughout the whole boiler in addition to the usual up-and-down or vertical circulation; further, in the arrangement of heads which communicate with each other both in a vertical and in a horizontal direction, and which are placed eccentrically toward the center lines of the respective pipes in such a manner that a free circulation of the water takes place throughout the entire series of pipes, and that the water and steam, on rising through the elevated end of one of the pipes, will strike the top plate of the head before being permitted to rise through the opening in the top of said head to the next head above, or to the steam-dome, and that by these means the steam is disengaged more readily from the water than it would be if the heads should be placed concentrically with the center lines of the pipe, in which case the water and steam issuing from the elevated end of the pipe rush right up together to the next succeeding head.

The invention consists further, in the arrangement of a water-jacket inclosing the inclined pipes and connecting with the heads through openings in such a manner that an additional heating-surface is created, and at the same time the water is free to circulate through the pipes, the heads, and the water-jacket.

The invention also consists in the arrangement of tubular brackets perforated with holes in their sides and inserted between the walls of the water-jacket, and of the heads, in combination with the screw-bolts, passing through said brackets in such a manner that the walls of the water-jacket are relieved from all strain from the bolts, and the circulation of the water and steam is not obstructed.

In the drawing—

The letter A designates the fire-grate of my boiler, to which access is had through the door B in the usual manner.

Over this grate, and supported in the rear by the wall C and in front by the cross-chamber containing the fire-door, is a series of inclined pipes, D, which are placed quincuncially or "taggered," as shown in fig. 2 of the drawing, and the ends of which terminate in heads E. By "staggering" the pipes they are better exposed to the action of the fire than they are if placed in regular rows, one above the other.

The heads connect with each other in a horizontal direction through holes *a*, and in a vertical direction through holes *b*, and both the holes *a* and *b* are placed eccentrically with the center lines of the pipes, so that the water and steam discharging from the elevated end of one of the pipes will strike the top and side plates of the heads before being permitted to rush out through the holes *a* or up through the holes *b*. By these means the steam is more readily disengaged from the water than it is if the holes *a* and *b* are placed concentrically with the center lines of the pipes, and while the water in striking the top and the side plates of the heads is checked in its direct course, the steam disengaged therefrom rises through the holes *b* and collects in a common steam-dome.

By means of the holes *a* in the sides of the heads a lateral or side circulation is produced between the pipes D, and thereby the circulation of the water throughout the boiler is materially facilitated.

The pipes D are inclosed in a water-jacket, F, which is composed of four distinct chambers, *c d e f*. The chamber *c* extends in front of the boiler, under the elevated ends of the pipes D, and it communicates with the lateral chambers *d e*.

These chambers form the side walls of the boiler and furnace, and they communicate with the heads E at both ends of the pipes D, and also with the chamber *f*, which forms the top of the boiler, and which communicates with the upper rows of the heads E, as shown.

From this last-named chamber extends a pipe, G, to the steam-dome, which, however, is not shown in the drawing.

All parts of the water-jacket are thus brought in communication with the pipes D, allowing the water to circulate freely throughout the entire boiler, and an additional heating-surface is provided, whereby the steam-generating capacity of the boiler is materially increased. The water-jacket will, in practice, be divided in several distinct sections or chambers, so that the same can be taken apart with great facility. The chambers are connected together and to the heads E by the bolts *m*.

To enable each bolt to throw the pressure caused by its nut directly to the joint between the inner plate and the adjoining head or chamber, a brace, *n*, of peculiar construction, is put in between the plates.

This brace is formed by a piece of pipe flanged on both ends, one flange inward and the other outward, leaving the end leading to the head or chamber wide open, and it is perforated in its sides with holes *o*, through which the circulation takes place.

By placing this bracket in between the plates of the chambers or heads all the pressure caused by the nuts on the ends of the bolts is conveyed directly to the joints between the different parts, and no piece has to bear more strain than that caused by the steam pressure, while if the brackets were omitted the stiffness of the outer plate would have to sustain and transfer the strain, which in addition to the steam-pressure would cause a danger of rupturing the same.

No claim is made to the arrangement of separate heads at the ends of the pipes, neither to the arrangement of the pipes in the form of a quincunx.

What is claimed as new, and desired to be secured by Letters Patent, is—

1. The arrangement of openings *a* in the heads E, so as to produce a side circulation in the horizontal or inclined pipes D, substantially in the manner set forth.

2. The heads E, provided with openings *a* in their sides, and with openings *b* in their tops, placed eccentrically toward the centre lines of the pipes D, substantially as shown and described.

3. The perforated tubular brackets *n*, through which bolts *m* pass, arranged with relation to the water-jacket F and heads E, substantially as set forth.

4. The water-chambers *d e* on the sides of the pipes D, and communicating with the heads E, substantially as described.

5. The water-jacket F, composed of chambers *c d e f*, communicating with the heads E and inclosing the pipes D, substantially as set forth.

WM. P. ABENDROTH.
JOHN GRIFFITH.
G. W. WUNDRAM.
T. H. MÜLLER.

Witnesses:
W. HAUFF,
E. F. KASTENHUBER.